(12) United States Patent
Haslebacher (10) Patent No.: US 8,506,666 B2
(45) Date of Patent: Aug. 13, 2013

(54) FILTER ASSEMBLY WITH IMPROVED GASKET

(76) Inventor: William J. Haslebacher, Bellevue, WA (US)

( * ) Notice: Subject to any disclaimer, the term of this patent is extended or adjusted under 35 U.S.C. 154(b) by 0 days.

(21) Appl. No.: 13/195,622

(22) Filed: Aug. 1, 2011

(65) Prior Publication Data

US 2012/0031059 A1 Feb. 9, 2012

Related U.S. Application Data

(60) Provisional application No. 61/370,683, filed on Aug. 4, 2010.

(51) Int. Cl.
*B01D 46/10* (2006.01)

(52) U.S. Cl.
USPC ............. 55/495; 55/497; 55/502; 55/DIG. 31

(58) Field of Classification Search
USPC ............... 55/497, 385.2, 492, 502, 510, 511, 55/506, DIG. 5, DIG. 31, 498, 521; 210/445, 210/450, 451, 493.1; 277/590, 650, 652
See application file for complete search history.

(56) References Cited

U.S. PATENT DOCUMENTS

| | | | |
|---|---|---|---|
| 3,490,211 A * | 1/1970 | Cartier | 55/487 |
| 3,721,067 A | 3/1973 | Agnew | |
| 3,724,172 A | 4/1973 | Wood | |
| 3,923,482 A | 12/1975 | Knab et al. | |
| 4,009,647 A | 3/1977 | Howorth | |
| 4,584,005 A | 4/1986 | Allan et al. | |
| 4,976,757 A | 12/1990 | Helmus | |
| 6,117,202 A | 9/2000 | Wetzel | |
| 6,203,590 B1 | 3/2001 | Byrd et al. | |
| 6,319,300 B1 * | 11/2001 | Chen | 55/497 |
| 6,632,260 B1 | 10/2003 | Siemers et al. | |
| 6,916,238 B2 | 7/2005 | Korman | |
| 7,261,757 B2 * | 8/2007 | Duffy | 55/502 |
| 7,300,486 B1 * | 11/2007 | Kirsch | 55/502 |
| 7,517,378 B2 * | 4/2009 | Knapp | 55/511 |
| 7,896,942 B2 * | 3/2011 | Gebert et al. | 55/502 |
| 7,931,723 B2 * | 4/2011 | Cuvelier | 55/484 |
| 7,931,726 B2 * | 4/2011 | Karlsson et al. | 55/521 |
| 7,938,927 B2 * | 5/2011 | Sundvik et al. | 156/196 |
| 7,947,101 B2 * | 5/2011 | Devine et al. | 55/484 |
| 8,163,052 B2 | 4/2012 | Ono | |
| 8,216,413 B2 * | 7/2012 | Langlands et al. | 156/244.11 |
| 8,372,181 B2 * | 2/2013 | Davies | 95/273 |

(Continued)

OTHER PUBLICATIONS

PCT International Search Report and Written Opinion for PCT Application No. PCT/US2011/046296, Mar. 16, 2012.
PCT International Preliminary Report on Patentability and Written Opinion for PCT Application No. PCT/US2011/046296; Feb. 14, 2013.

(Continued)

*Primary Examiner* — Duane Smith
*Assistant Examiner* — Minh-Chau Pham
(74) *Attorney, Agent, or Firm* — Graybeal Jackson LLP (57) ABSTRACT

A filter gasket seals at least one mitered corner of a filter frame having a substantially planar first surface and an adjacent side surface. The gasket includes at least first and second elongated gasket segments formed from compressible material. Each segment has a substantially planar surface adapted to contact the substantially planar first surface of the filter frame. The first and second gasket segments also each include an end which, when brought into joined engagement with the end of the other gasket segment, forms an interlocking miter joint to seal the at least one mitered corner of the filter frame.

39 Claims, 4 Drawing Sheets

(56) References Cited

U.S. PATENT DOCUMENTS

| | | |
|---|---|---|
| 2003/0150328 A1 | 8/2003 | Hansson et al. |
| 2009/0120047 A1 | 5/2009 | Perrier et al. |
| 2009/0223368 A1 | 9/2009 | Augustine et al. |
| 2009/0288555 A1 | 11/2009 | Kristensson et al. |
| 2010/0051530 A1 | 3/2010 | Manz et al. |
| 2010/0120349 A1 | 5/2010 | Kristensson et al. |

OTHER PUBLICATIONS

PCT International Preliminary Report on Patentability and Written Opinion for PCT Application No. PCT/US2011/046302; Feb. 14, 2013.

PCT International Search Report and Written Opinion for PCT Application No. PCT/US2011/046302; Feb. 24, 2012.

\* cited by examiner

FILTER ASSEMBLY WITH IMPROVED GASKET

CLAIM OF PRIORITY

The present application claims the benefit of U.S. Provisional Patent Application Ser. No. 61/370,683, filed on Aug. 4, 2010, which is incorporated herein by reference in its entirety.

BACKGROUND

There are many circumstances where it is absolutely essential to assure a clean or sterile environment. An obvious example is in hospitals, and especially in operating rooms of hospitals. In the operating room setting, it is the wound site of the patient where sterility is of most importance. Unfortunately, in current approaches, the most critical area of concern, the wound site, is not given primary attention. Rather, current approaches have been just the opposite by giving attention to the condition of the operating room in general in creating a "clean" room without paying special attention to the wound site. This can result in the wound site actually being the area of least cleanliness because it is at the wound site that the most activity occurs during a surgical procedure that both sets contaminants airborne and blocks clean air access to the wound site.

Contaminated particles can be made up of particulates from any substance, such as dirt and dust, and can include bacterial and virus nebular matter transported either through the air from multiple sources or by touch on surfaces. Neither source of transport can be ignored. The same contaminates can pass from air to surface many times over the course of existence. The present invention addresses the need for establishing a clean air environment at a targeted site, such as, for example, a surgically sterile wound site of a patient.

SUMMARY

In one embodiment, a filter gasket seals at least one mitered corner of a filter frame having a substantially planar top surface and an adjacent side surface. The gasket comprises at least first and second elongated gasket segments formed from compressible material. Each segment has a substantially planar surface adapted to contact the substantially planar first surface of the filter frame. The first and second gasket segments also each include an end which, when brought into joined engagement with the end of the other gasket segment forms an interlocking miter joint to seal the at least one mitered corner of the filter frame.

The interlocking miter joint may form a substantially right angle joint. The interlocking miter joint has an inside corner and an outside corner. The ends of the gasket segments are configured to form a circuitous seam between the gasket segments from the inner corner to the outer corner. The circuitous seam may include a zigzag seam portion between the gasket segments from the inner corner to the outer corner.

The ends of the gasket segments may be configured to preclude longitudinal displacement of the joined gasket segments. Each gasket segment includes a tapered surface opposite the planar surface. The gasket segments define an inner edge and an outer edge and the tapered surface of the gasket segments causes the gasket segments to have a decreasing thickness from the outside edge to the inside edge.

The filter segments may each include an extension extending from the substantially planar surface to wrap around from the substantially planar first surface of the filter frame to and along the adjacent side surface of the filter frame. The filter frame may have an inner edge and an outer edge. The extension of the gasket segments may be configured to wrap around the outer edge of the filter frame. The at least first and second elongated gasket segments are formed from smooth outer surface closed cell compressible material.

The filter gasket may further include third and fourth elongated gasket segments formed of compressible material. The first, second, third and fourth gasket segments may be arranged to form four substantially right angle miter joints when joined together. Each miter joint may be formed by adjacent segments which form an interlocking miter joint.

Each interlocking miter joint has an inside corner and an outside corner. The ends of the gasket segments may be configured to form a circuitous seam between the adjacent gasket segments from the inner corner to the outer corner. Each circuitous seam may include a zigzag seam portion between the adjacent gasket segments from the inner corner to the outer corner.

The ends of the gasket segments may be configured to preclude longitudinal displacement of the joined gasket segments. Each gasket segment may include a tapered surface opposite the planar surface. The gasket segments define an inner edge and an outer edge. The tapered surface of the gasket segments causes the gasket segments to have a decreasing thickness from the outside edge to the inside edge.

Each filter segment may include an extension extending from the substantially planar surface to wrap around from the substantially planar first surface of the filter frame to and along the adjacent side surface of the filter frame. The filter frame has an inner edge and an outer edge and the extension of each gasket segment may be configured to wrap around the outer edge of the filter frame.

The gasket segments may be formed from smooth outer surface closed cell compressible material.

In another embodiment, a filter arrangement comprises a frame including a plurality of frame segments. Each frame segment has a substantially planar first surface and an adjacent side surface. The frame segments may be joined to form a like plurality of mitered joints. The arrangement further includes an ultra-high grade filter media spanning the frame from within the frame segments and a filter gasket that seals the mitered joints of the filter frame. The filter gasket includes a like plurality of elongated gasket segments formed from compressible material. Each segment has a substantially planar surface adapted to contact the substantially planar first surface of a corresponding filter frame segment and an end which, when brought into joined engagement with the end of another one of the gasket segments, forms an interlocking miter joint overlying a corresponding one of the mitered joints of the filter frame.

Each interlocking miter joint may form a substantially right angle joint. Each interlocking miter joint has an inside corner and an outside corner. The ends of the gasket segments may be configured to form a circuitous seam between adjacent ones of the gasket segments from the inner corner to the outer corner. The circuitous seam may include a zigzag seam portion between the gasket segments from the inner corner to the outer corner.

The ends of the gasket segments are configured to preclude longitudinal displacement of the joined gasket segments. Each gasket segment may include a tapered surface opposite the planar surface.

The gasket segments may define an inner edge and an outer edge. The tapered surface of the gasket segments causes the gasket segments to have a decreasing thickness from the outside edge to the inside edge.

The filter segments may each include an extension extending from the substantially planar surface to wrap around from the substantially planar first surface of the filter frame to and along the adjacent side surface of the filter frame. The filter frame may have an inner edge and an outer edge. The extension of the gasket segments may wrap around the outer edge of the filter frame. The elongated gasket segments may be formed from a smooth outer surface closed cell compressible material.

In another embodiment, a filter assembly includes a filter arrangement comprising a frame including a plurality of frame segments. Each frame segment has a substantially planar first surface and an adjacent side surface. The frame segments are joined to form a like plurality of mitered joints. An ultra-high grade filter media spans the frame from within the frame segment. The assembly further includes a filter gasket that seals the mitered joints of the filter frame. The filter gasket includes a like plurality of elongated gasket segments formed from compressible material. Each segment has a substantially planar surface adapted to contact the substantially planar first surface of a corresponding filter frame segment and an end which, when brought into joined engagement with the end of another one of the gasket segments forms an interlocking miter joint overlying a corresponding one of the mitered joints of the filter frame. The assembly further includes a receptacle having wall segments configured to receive the filter arrangement, to compress the interlocking gasket miter joints together and to compress the compressible gasket material along the elongated gasket segments.

Each interlocking miter joint may be configured to form a substantially right angle joint. Each interlocking miter joint has an inside corner and an outside corner. The ends of the gasket segments may be configured to form a circuitous seam between adjacent ones of the gasket segments from the inner corner to the outer corner. The circuitous seam may include a zigzag seam portion between the gasket segments from the inner corner to the outer corner.

The ends of the gasket segments may be configured to preclude longitudinal displacement of the joined gasket segments. Each gasket segment may include a tapered surface opposite the planar surface. The gasket segments may be configured to define an inner edge and an outer edge and the tapered surface of the gasket segments causes the gasket segments to have a decreasing thickness from the outside edge to the inside edge.

Each filter segment may include an extension extending from the substantially planar surface to wrap around from the substantially planar first surface of the filter frame to and along the adjacent side surface of the filter frame. The filter frame may be configured to have an inner edge and an outer edge. The extension of the gasket segments may then wrap around the outer edge of the filter frame.

BRIEF DESCRIPTION OF THE DRAWINGS

The features of the present invention which are believed to be novel are set forth with particularity in the appended claims. The invention, together with further features and advantages thereof, may best be understood by making reference to the following description taken in conjunction with the accompanying drawings, in the several figures of which like reference numerals identify identical elements, and wherein:

DETAILED DESCRIPTION

Figure 1:
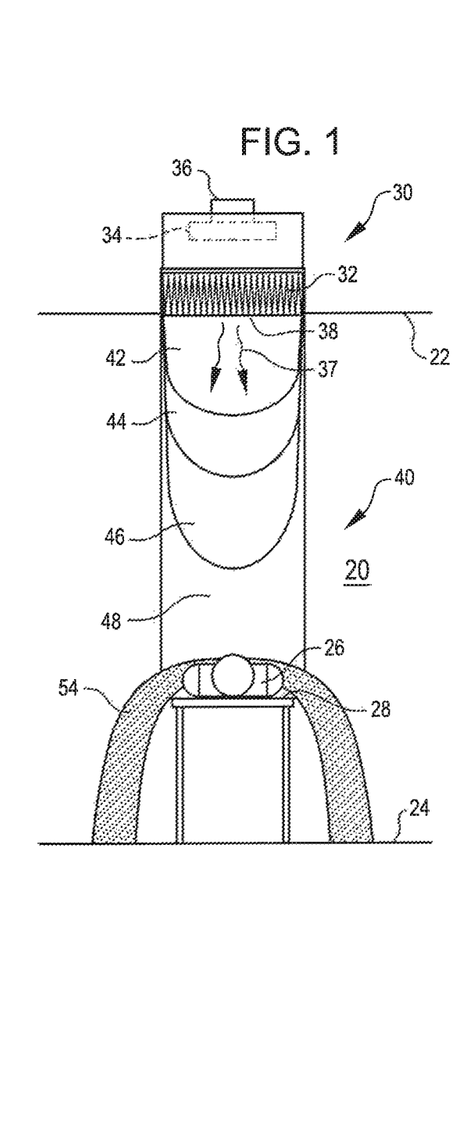
FIG. 1 is a simplified view of an operating room with a patient on an operating table and placed within a focused clean air zone column according to aspects of the present invention.

Referring now to FIG. 1, it shows an operating room 20 having a ceiling 22 and a floor 24. Also shown is a patient 26 in need of a surgical procedure disposed in a supine position on an operating table 28.

Above the patient and mounted within the ceiling 22 is a ceiling mounted filter unit 30 embodying the present invention. The filter unit includes an ultra-high grade filter 32 and a blower 34. Air enters the filter unit 30 through an intake 36.

The ultra-grade filter may be a high efficiency particle arrestor (HEPA) filter, an ultimate level particle arrester (ULPA) filter, or any other filter having filter characteristics the same as or better than a HEPA filter efficiency grade. HEPA filters are 99.99 percent or greater efficient for particles at 0.3 microns in size and larger. ULPA filters are 99.999 percent or greater efficient for particles at 0.1 microns in size and larger.

The air provided to intake 36 may be from the building regular air supply directly or indirectly connected. Alternatively, the air supplied to intake 36 may to some degree be pre-filtered.

The blower 34 forms an air flow generator that pulls air from the intake 36 and forces the air through the filter 32. It may be an impeller blower, for example. Alternatively the blower may be an axial blower or a housed blower.

The blower is operable to force air 37 from the filter face 38 at a velocity between 70 feet per minute to 200 feet per minute. The ultra-clean air exiting the filter 32 within that velocity range will form a focused clean air zone column 40 extending from the filter face 38. The focused clean air zone column 40 has a profile comprising a plurality of zones 42, 44, 46, and 48. Each zone represents a minimum number of airborne particles per cubic foot of air. The profile of the focused clean air zone column will be described more completely subsequently.

The operating table 28 is arranged to place the patient 26 into a position whereby the critical surgical wound site of the patient 26 will be within zone 48 of the focused clean air zone column 40. This assures that the surgical wound site will be within surgically clean air.

The focused clean air column 40 commences at the point the airflow projection expels into a surrounding air from the rigid enclosure and filter. Here, the focused clean air column 40 commences at the filter exhaust side face 38. The air flows as a nearly single mass with the air across the column flowing at nearly the same velocity, thereby creating laminar flow. The air that is constantly being expelled is pushing the air mass in front until all of the energy is expended.

Figure 2:
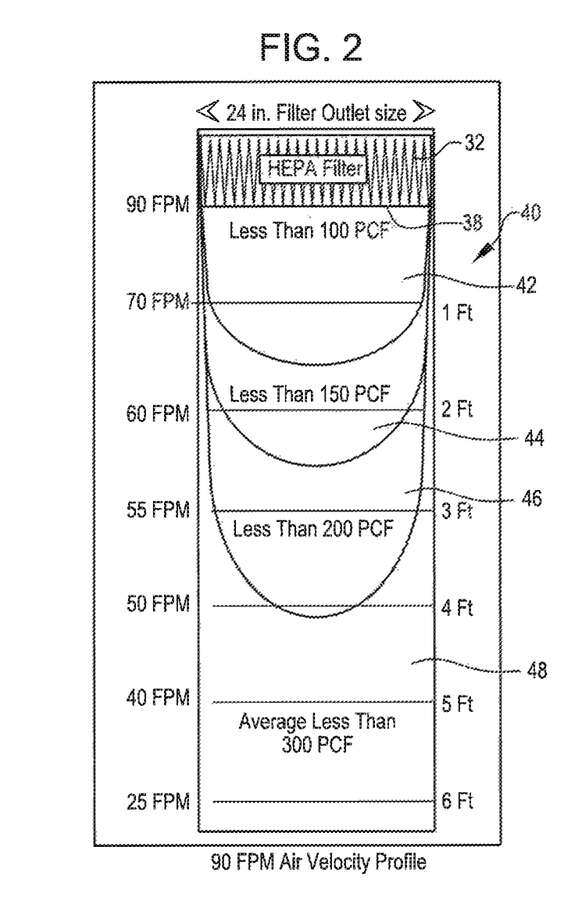
FIG. 2 is a diagram illustrating a focused clean air zone column profile for a focused clean air zone column formed by the movement of ultra-clean air from an ultra-high grade filter at a velocity of 90 feet per minute.

FIG. 2 shows the profile of the focused clean air zone column 40 of FIG. 1 for an initial air flow velocity at the filter face 38 of 90 feet per minute. As the air flows out from the filter, air outside of the column 40 will begin to mix with the air within the column along the corresponding edges 40. However, by virtue of the laminar flow of the air and the initial cleanliness of the air at the filter face 38, the air within the column 40 remains extremely clean throughout the length of the column 40. To that end, the first zone 42 extends out to about 1.5 feet and contains less than 100 particles per cubic foot of air. The second zone 44 extends out to about 2.5 feet and contains less than 150 particles per cubic foot of air. The third zone 46 extends out to about just over 4 feet and contains less than 200 particles per cubic foot of air. Lastly, the fourth zone 46 extends out to over 6 feet and contains less than 300 particles per cubic foot of air. As shown in FIG. 1, the patient is disposed within the fourth zone 48. Any one of these zones would provide sufficiently clean air to support a surgical procedure within a surgically clean air environment at the serial field target.

FIG. 2 also shows the air velocity for air flow out from the filter 32. At 4 feet out, for example, the air flow velocity is about 50 feet per minute. It is important that the air velocity not be so high as to cause rapid drying of tissue at the surgical wound site or create turbulence within the zone thereby reducing its effectiveness. All of the air velocities shown in FIG. 2 are well below such an air velocity. However, all of the air flow velocities illustrated are sufficient to provide an additional important function. That is to force any contaminants 54 (FIG. 1) created during the surgery and other undesirable airborne side products from the surgery, such as cauterization smoke, to be forced downward gently towards the floor and away and down below the surgical wound site and the operating room personnel upper portion of their bodies without any bounce back of the contaminated smoke filled air into critical areas off nearby objects or the floor.

Figure 3:
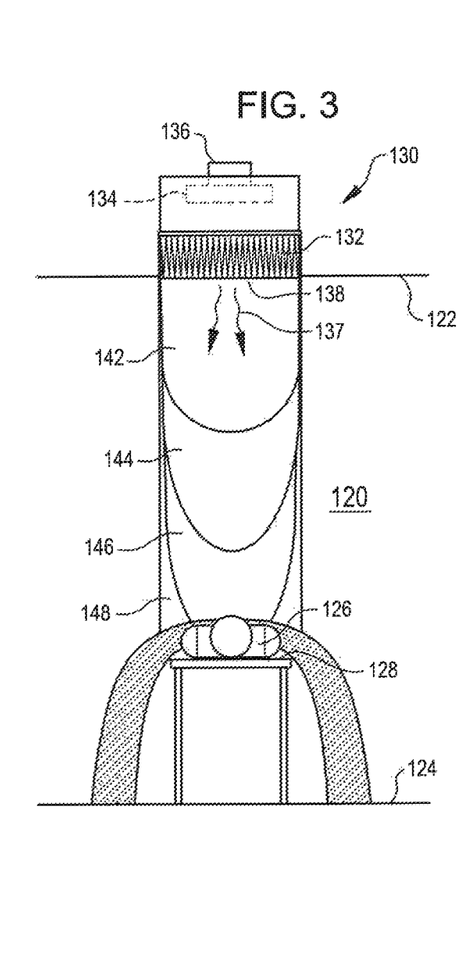
FIG. 3 is another simplified view of an operating room with a patient on an operating table and placed within a focused clean air zone column according to further aspects of the present invention.

Referring now to FIG. 3, it shows another operating room 120 having a focused clean air zone column 140 extending therein formed by an initial air velocity of 120 feet per minute. The operating room 120 has a ceiling 122 and a floor 124. Also shown is a patient 126 in need of a surgical procedure disposed in a supine position on an operating table 128.

Above the patient and mounted within the ceiling 122 is a ceiling mounted filter unit 130 embodying the present invention. The filter unit includes an ultra-high grade filter 132 and a blower 134. Air enters the filter unit 130 through an intake 136.

As in the previous embodiment, the ultra-grade filter may be a high efficiency particle arrestor (HEPA) filter, an ultimate level particle arrester (ULPA) filter, or any other filter having filter characteristics the same as or better than a HEPA filter. HEPA filters are 99.99 percent efficient for particles at 0.3 microns in size or larger.

The air provided to intake 136 may be from the building regular air supply. Alternatively, the air supplied to intake 136 may to some degree be pre-filtered.

The blower 134 forms an air flow generator. As in the previous embodiment, it may be an impeller blower, for example. Alternatively the blower may be an axial blower or a housed blower.

The blower is operable to force air 137 from the filter face 138 at a velocity of 120 feet per minute, within the 70 feet per minute to 200 feet per minute velocity range previously mentioned. The ultra-clean air exiting the filter 132 at those velocities will thus form the focused clean air zone column 140 extending from the filter face 138. The focused clean air zone column 140 has a profile comprising a plurality of zones 142, 144, 146, and 148. Again, each zone represents a minimum number of airborne particles per cubic foot of air.

The operating table 128 is arranged to place the patient 126 into a position whereby the surgical wound site of the patient 126 will be within zone 146 of the focused clean air zone column 140. This assures that the surgical wound site will be within surgical quality clean air.

The focused clean air zone column 140 commences at the filter face 38. Because the initial flow velocity is within the 70 to 200 foot per minute velocity range, the air flows as a nearly single mass with the air across the column flowing at nearly uniform velocity in laminar flow.

Figure 4:
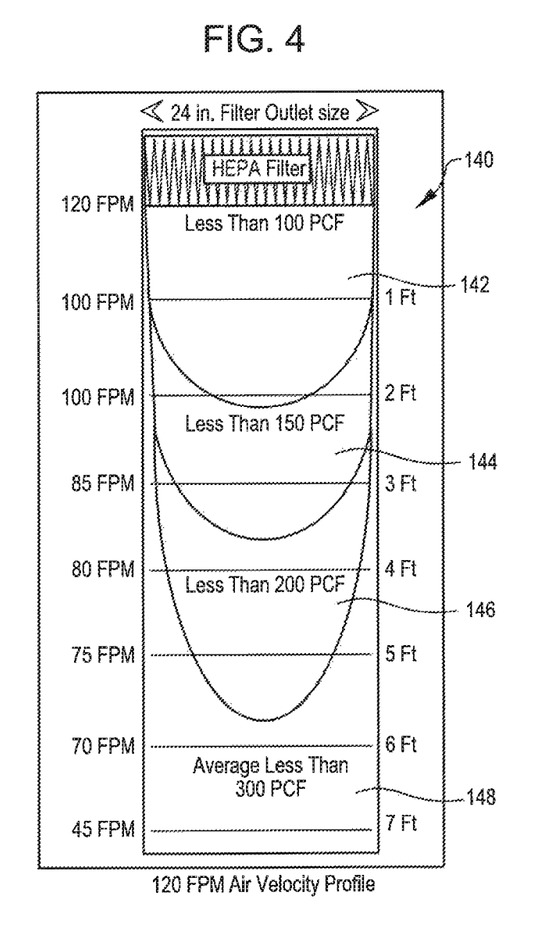
FIG. 4 is a diagram illustrating a focused clean air zone column profile for a focused clean air zone column formed by the movement of ultra-clean air from an ultra-high grade filter at a velocity of 120 feet per minute.

FIG. 4 shows the profile of the focused clean air zone column 140 of FIG. 3. As the air flows out from the filter, air outside of the column 140 will begin to mix with the air within the column 140. However, by virtue of the laminar flow of the air and the initial cleanliness of the air at the filter face 138, the air within the column 140 remains extremely clean throughout the length of the column 140. To that end, the first zone 142 extends out to just over 2 feet and contains less than 100 particles per cubic foot of air. The second zone 144 extends out to just over 3.5 feet and contains less than 150 particles per cubic foot of air. The third zone 146 extends out to about just over 5.5 feet and contains less than 200 particles per cubic foot of air. Lastly, the fourth zone 148 extends out to over 7 feet and contains less than 300 particles per cubic foot of air. Any one of these zones would provide sufficiently clean air to support a surgical procedure within a surgically clean air environment. As may be realized from the profile of FIG. 2 representing an initial air flow velocity of 90 feet per minute and the profile of FIG. 4 representing an initial air flow velocity 120 feet per minute, the focused clean air zone columns are similar except that the column formed with an initial velocity of 120 feet per minute extends out farther than the column formed with an initial velocity of 90 feet per minute.

FIG. 4 also shows the air velocity for air flow out from the filter 132. While the air flow velocities represented in the profile of FIG. 4 are higher than in the profile of FIG. 2, the air flow velocities shown in FIG. 4 are still not so high as to cause rapid drying of tissue at the surgical open wound site. All of the air velocities shown in FIG. 4 are well below such an air velocity.

Figure 5:
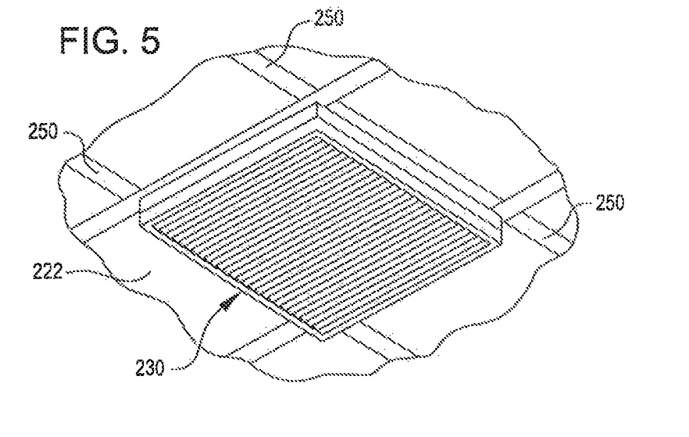
FIG. 5 is a partial perspective view of a ceiling having a filter unit embodying aspects of the present invention mounted within T-bar supports of the ceiling.

FIG. 5 is a partial perspective view of a ceiling 222 having a filter unit 230 mounted within the T-bar supports of the ceiling. In the arrangement of FIG. 5, intake air may most readily be obtained from the building HVAC system. However, the intake air may be obtained from other sources as well and may even be pre-filtered to some extent. While hospitals and hospital operating rooms would not generally use T-bar ceiling supports, such a ceiling is shown herein to emphasize the point that a surgically clean air targeted air environment may be obtain in most any room or space by practicing the embodiments of the invention.

Figure 6:
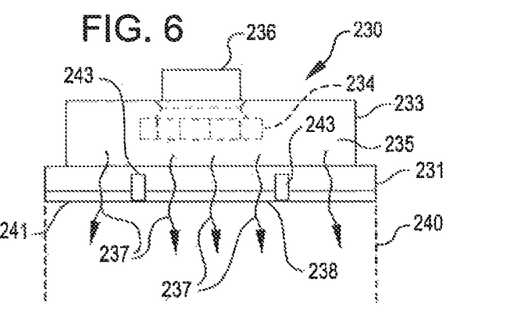
FIG. 6 is a side view of a filter unit embodying aspects of the present invention mountable within the ceiling of FIG. 5.

FIG. 6 is a side view of the filter unit 230 embodying aspects of the present invention which may be mounted within the ceiling of FIG. 5 or used in most any application according to the invention, including within hospitals and operating rooms. The filter unit includes a filter housing or receptacle 231 and a blower housing 233. The filter receptacle 231 contains a filter arrangement to be described subsequently which includes an ultra-high grade filter (not shown). The blower housing 233 contains an impeller blower 234. Air enters the filter unit 230 through an intake 236. The interior 235 of the blower housing 233 forms a plenum chamber which, along with the back pressure provided by the ultra-high grade filter, causes the air flow 237 from the blower 234 to be evenly distributed across the filter face 238. The blower 234 is operable to force the air through the filter at initial air flow velocities from 70 feet per minute to 200 feet per minute. This causes a focused clean air zone column 240 of air to extend form the filter face 238.

The filter receptacle 231 includes a door panel that is hingedly connected to the filter receptacle 231 by hinges 243. The hinged door 241 permits ready exchanges of filters when required.

When a filter is placed within the filter receptacle 231, it is important that the perimeter of the filter is well sealed to preclude unclean ambient air from circulating around the filter and entering the room in an unfiltered condition. Such an occurrence could carry most serious consequences. More particularly, the seal should be provided along the perimeter of the filter between the filter and the receptacle. Experience has shown that obtaining such a reliable seal is most difficult in the corners of the filter.

In accordance with the present invention, a secure and reliable seal is obtained about the ultra-high grade filter by a filter arrangement 250 shown in FIGS. 7-10. The filter arrangement 250 in FIGS. 7-10 may be employed to advantage in any of the embodiments previously described and provides such a secure seal in accordance with the present invention. The filter arrangement 250 includes a frame 252, a gasket 254, and an ultra-high grade filter media 256.

Figure 7:
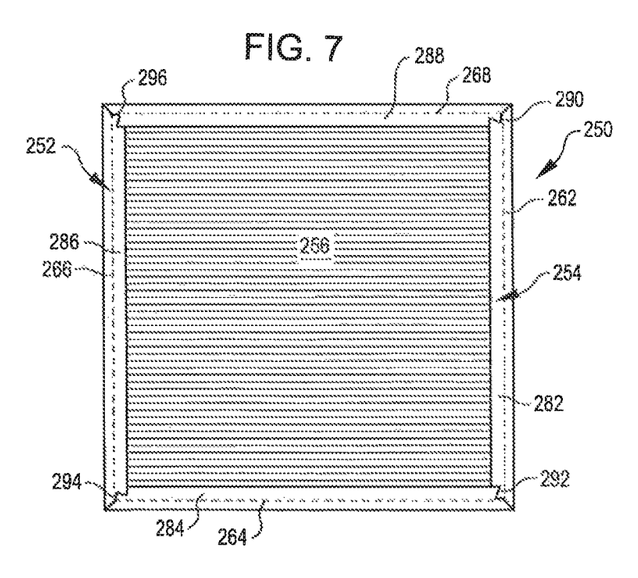
FIG. 7 is a top plan view of a filter arrangement which may be employed in the filter unit of FIG. 6 according to further aspects of the invention.
Figure 8:
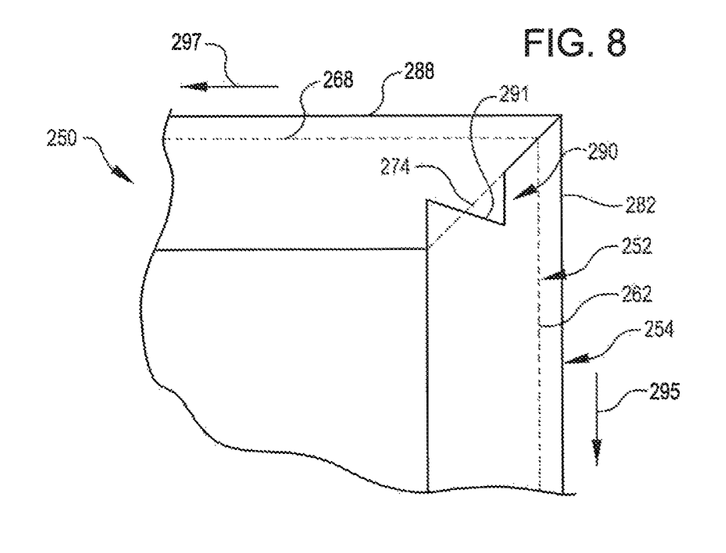
FIG. 8 is a partial plan view of a gasket employed in the filter arrangement of FIG. 7 according to further aspects of the present invention.
Figure 9:
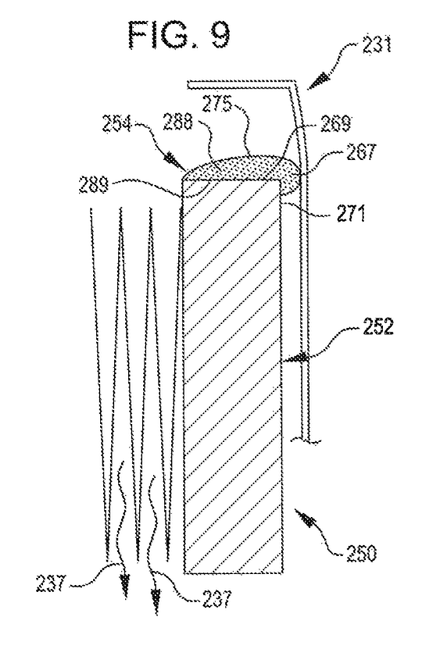
FIG. 9 is a partial side view illustrating the filter arrangement of FIG. 7 being placed within a filter receptacle of the filter unit of FIG. 6 to form a filter assembly according to aspects of the invention.
Figure 10:
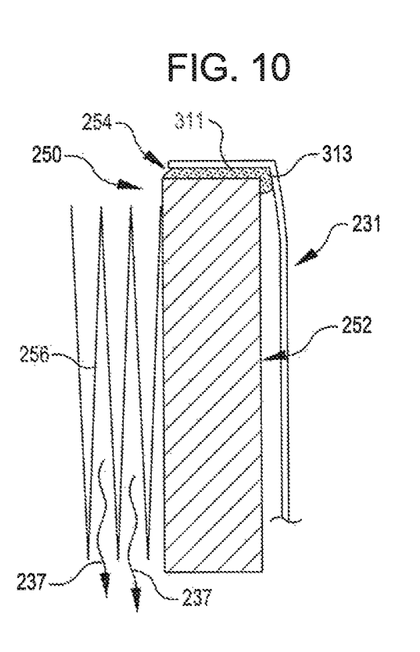
FIG. 10 is partial side view of the filter assembly of FIG. 9 ready for use according to still further aspects of the invention.

The frame 252 includes a plurality of frame segments 262, 264, 266, and 268. Each frame segment has a substantially planar first surface and an adjacent side surface. To illustrate, as seen in FIGS. 7 and 9, segment 268 has a substantially planar first surface 269 and an adjacent side surface 271. The frame segments are joined in series to form a like plurality of miter joints. FIG. 8 shows the miter joint 274 formed between frame segment 268 and frame segment 262. The frame miter joints, such as miter joint 274, are potentials sources for air leaks that must be addressed. As may be seen in FIG. 7, the ultra-high grade filter media 256 spans the frame segments 262, 264, 266, and 268 and as best seen in FIGS. 9 and 10, terminates within the filter frame 252. As may also be seen in FIGS. 9 and 10, the first surface 269 is substantially transverse to the air flow 237 and the adjacent side surface 271 is substantially parallel to the air flow 237.

The gasket 254 includes a like plurality of elongated gasket segments 282, 284, 286, and 288. The gasket segments may be formed from compressible material, such as closed cell neoprene treated to have a smooth outer surface. Each gasket segment has a substantially planar surface adapted to contact the substantially planar first surface of a corresponding filter segment. To illustrate, as may be seen in FIG. 9, the gasket segment 288 has a substantially planar surface 289 that makes broad surface contact with the substantially planar surface 269 of the frame segment 268. Also, each gasket segment has an extension extending from the substantially planar surface to wrap around, from the substantially planar first surface of the filter frame to and along the adjacent side surface of the filter frame. To that end, it may be seen in FIG. 9 that gasket segment 288 has an extension 267 that wraps around, from the substantially planar first surface 269 of the filter frame to and along the adjacent side surface 271 of the filter frame.

Still further, each gasket segment has a tapered surface opposite its substantially planar surface. For example, as may be seen in FIG. 9, the gasket segment 288 has a tapered surface 275 opposite the substantially planar surface 289. The tapered surface is formed so as to have a decreasing thickness from the outer edge of the gasket to the inner edge of the gasket.

As may be noted from the above, the gasket 254 is arranged to overlie and wrap around the filter frame 252. In the corners, the gasket overlies the miter joints of the filter frame with an interlocking miter joint. To that end, as may be noted in FIG. 7, the ends of the gasket segments are configured and joined together to provide gasket 262 with substantially right angle interlocking miter joints 290, 292, 294, and 296. Each of the interlocking miter joints overlies a corresponding miter joint of the filter frame. As may be best seen in FIG. 8, the interlocking miter joint 290 is shown in greater detail. The ends of the gasket segments 288 and 282 are configured to form a circuitous zigzag seam 291 to form the interlocking miter joint 290. This structure is repeated for all four corners of the gasket 254. The circuitous interlocking miter joints are configured to preclude longitudinal displacement of the gasket segments after they are joined. More particularly, the ends of gasket segments 282 and 288 are shaped to resist displacement of the segments along the longitudinal lines 295 and 297 shown in FIG. 8. This improves manufacturability of the gasket. The circuitous path of the interlocking miter joints also importantly provides a reliable seal at the filter frame corners to outside, unfiltered air.

FIG. 10 shows the filter arrangement 250 received within the filter receptacle 231 to complete the filter unit 230 of FIG. 6. The air moves through the filter arrangement in the direction of arrows 237. The first surface 269 is substantially transverse to the air flow 237 and the adjacent side surface 271 is substantially parallel to the air flow 237. Here it may be seen that the gasket 254 is compressed by the receptacle. Such compression occurs along the entire perimeter of the gasket, including the gasket corners. To that end, a first seal 311 is formed, a second seal 313 is formed, and a third seal is formed along the interlocking miter joints. In addition, when the filter arrangement 250 is received within the receptacle 231, the compression of the gasket segments forces the segments into the receptacle corners to enhance the sealing effect of the interlocking miter joints of the gasket.

While particular embodiments of the present invention have been shown and described, modifications may be made, and it is therefore intended in the appended claims to cover all such changes and modifications which fall within the true spirit and scope of the invention as defined by those claims.

What is claimed is:

1. A filter arrangement comprising a filter gasket that seals at least one mitered corner of the filter frame having a substantially planar first surface substantially transverse to fluid flow through the filter and an adjacent side surface substantially parallel to fluid flow through the filter, at least first and second elongated gasket segments formed from compressible material, each segment having a substantially planar surface adapted to completely overlie and contact the substantially planar first surface of the filter frame, the first and second gasket segments also each including an end which, when brought into joined engagement with the end of the other gasket segment forms an interlocking miter joint to overlap and seal the at least one mitered corner of the filter frame.

2. The filter gasket of claim 1, wherein the interlocking miter joint forms a substantially right angle joint.

3. The filter gasket of claim 1, wherein the interlocking miter joint has an inside corner and an outside corner, and wherein the ends of the gasket segments are configured to form a circuitous seam between the gasket segments from the inner corner to the outer corner.

4. The filter gasket of claim 3, wherein the circuitous seam includes a zigzag seam portion between the gasket segments from the inner corner to the outer corner.

5. The filter gasket of claim 1, wherein the ends of the gasket segments are configured to preclude longitudinal displacement of the joined gasket segments.

6. The filter gasket of claim 1, wherein each gasket segment includes a tapered surface opposite the planar surface.

7. The filter gasket of claim 6 wherein the gasket segments define an inner edge and an outer edge and wherein the tapered surface of the gasket segments causes the gasket segments to have a decreasing thickness from the outside edge to the inside edge.

8. The filter gasket of claim 1, wherein the filter segments each includes an extension extending from the substantially planar surface to wrap around from the substantially planar first surface of the filter frame to and along the adjacent side surface of the filter frame.

9. The filter gasket of claim 8 wherein the filter frame has an inner edge and an outer edge, and wherein the extension of the gasket segments wrap around the outer edge of the filter frame.

10. The filter gasket of claim 1, wherein the at least first and second elongated gasket segments are formed from smooth outer surface closed cell compressible material.

11. The filter gasket of claim 1, further including third and fourth elongated gasket segments formed of compressible material, each of the third and fourth elongated segments having a substantially planar surface adapted to completely overlie and contact the substantially planar first surface of the filter frame, the first, second, third and fourth gasket segments being arranged to form four substantially right angle miter joints when joined together, each miter joint being formed by adjacent segments which form an interlocking miter joint.

12. The filter gasket of claim 11, wherein each interlocking miter joint has an inside corner and an outside corner, and wherein the ends of the gasket segments are configured to form a circuitous seam between the adjacent gasket segments from the inner corner to the outer corner.

13. The filter gasket of claim 12, wherein each circuitous seam includes a zigzag seam portion between the adjacent gasket segments from the inner corner to the outer corner.

14. The filter gasket of claim 11, wherein the ends of the gasket segments are configured to preclude longitudinal displacement of the joined gasket segments.

15. The filter gasket of claim 11, wherein each gasket segment includes a tapered surface opposite the planar surface.

16. The filter gasket of claim 15 wherein the gasket segments define an inner edge and an outer edge and wherein the tapered surface of the gasket segments causes the gasket segments to have a decreasing thickness from the outside edge to the inside edge.

17. The filter gasket of claim 11, wherein each filter segment includes an extension extending from the substantially planar surface to wrap around from the substantially planar first surface of the filter frame to and along the adjacent side surface of the filter frame.

18. The filter gasket of claim 17 wherein the filter frame has an inner edge and an outer edge, and wherein the extension of each gasket segment wraps around the outer edge of the filter frame.

19. The filter gasket of claim 11, wherein the gasket segments are formed from smooth outer surface closed cell compressible material.

20. A filter arrangement comprising:
a frame including a plurality of frame segments, each frame segment having a substantially planar first surface substantially transverse to fluid flow through the filter arrangement and an adjacent side surface, the frame segments being joined to form a like plurality of mitered joints;
an ultra-high grade filter media spanning the frame from within the frame segments; and
a filter gasket that seals the mitered joints of the filter frame, the filter gasket including a like plurality of elongated gasket segments formed from compressible material, each segment having a substantially planar surface completely overlying and contacting the substantially planar first surface of a corresponding filter frame segment and an end which, when brought into joined engagement with the end of another one of the gasket segments forms an interlocking miter joint overlying a corresponding one of the mitered joints of the filter frame.

21. The filter arrangement of claim 20, wherein each interlocking miter joint forms a substantially right angle joint.

22. The filter arrangement of claim 20, wherein each interlocking miter joint has an inside corner and an outside corner, and wherein the ends of the gasket segments are configured to form a circuitous seam between adjacent ones of the gasket segments from the inner corner to the outer corner.

23. The filter arrangement of claim 22, wherein the circuitous seam includes a zigzag seam portion between the gasket segments from the inner corner to the outer corner.

24. The filter arrangement of claim 20, wherein the ends of the gasket segments are configured to preclude longitudinal displacement of the joined gasket segments.

25. The filter arrangement of claim 20, wherein each gasket segment includes a tapered surface opposite the planar surface.

26. The filter arrangement of claim 25 wherein the gasket segments define an inner edge and an outer edge and wherein the tapered surface of the gasket segments causes the gasket segments to have a decreasing thickness from the outside edge to the inside edge.

27. The filter arrangement of claim 20, wherein the filter segments each includes an extension extending from the substantially planar surface to wrap around from the substantially planar first surface of the filter frame to and along the adjacent side surface of the filter frame.

28. The filter arrangement of claim 27 wherein the filter frame has an inner edge and an outer edge, and wherein the extension of the gasket segments wrap around the outer edge of the filter frame.

29. The filter arrangement of claim 20, wherein the elongated gasket segments are formed from smooth outer surface closed cell compressible material.

30. A filter assembly comprising:
a filter arrangement comprising a frame including a plurality of frame segments, each frame segment having a substantially planar first surface substantially transverse to fluid flow through the filter assembly and an adjacent side surface, the frame segments being joined to form a like plurality of mitered joints, an ultra-high grade filter media spanning the frame from within the frame segments, and a filter gasket that seals the mitered joints of the filter frame, the filter gasket including a like plurality of elongated gasket segments formed from compressible material, each segment having a substantially planar surface completely overly and contacting the substantially planar first surface of a corresponding filter frame segment and an end which, when brought into joined engagement with the end of another one of the gasket segments forms an interlocking miter joint overlying a corresponding one of the mitered joints of the filter frame; and a receptacle having wall segments configured to receive the filter arrangement, to compress the interlocking gasket miter joints together and to compress the compressible gasket material along the elongated gasket segments.

31. The filter assembly of claim 30, wherein each interlocking miter joint forms a substantially right angle joint.

32. The filter assembly of claim 30, wherein each interlocking miter joint has an inside corner and an outside corner, and wherein the ends of the gasket segments are configured to form a circuitous seam between adjacent ones of the gasket segments from the inner corner to the outer corner.

33. The filter assembly of claim 32, wherein the circuitous seam includes a zigzag seam portion between the gasket segments from the inner corner to the outer corner.

34. The filter assembly of claim 30, wherein the ends of the gasket segments are configured to preclude longitudinal displacement of the joined gasket segments.

35. The filter assembly of claim 30, wherein each gasket segment includes a tapered surface opposite the planar surface.

36. The filter assembly of claim 35, wherein the gasket segments define an inner edge and an outer edge and wherein the tapered surface of the gasket segments causes the gasket segments to have a decreasing thickness from the outside edge to the inside edge.

37. The filter assembly of claim 30, wherein the filter segments each includes an extension extending from the substantially planar surface to wrap around from the substantially planar top surface of the filter frame to and along the adjacent side surface of the filter frame.

38. The filter assembly of claim 37, wherein the filter frame has an inner edge and an outer edge, and wherein the extension of the gasket segments wrap around the outer edge of the filter frame.

39. The filter arrangement of claim 30, wherein the elongated gasket segments are formed from smooth outer surface closed cell compressible material.

\* \* \* \* \*